United States Patent
Bechard et al.

(10) Patent No.: US 11,654,550 B1
(45) Date of Patent: May 23, 2023

(54) SINGLE ITERATION, MULTIPLE PERMUTATION ROBOT SIMULATION

(71) Applicant: X Development LLC, Mountain View, CA (US)

(72) Inventors: Paul Bechard, San Jose, CA (US); Matthew Bennice, San Jose, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 202 days.

(21) Appl. No.: 17/097,785

(22) Filed: Nov. 13, 2020

(51) Int. Cl.
*B25J 9/16* (2006.01)
*B25J 9/00* (2006.01)

(52) U.S. Cl.
CPC ........... *B25J 9/1605* (2013.01); *B25J 9/0084* (2013.01)

(58) Field of Classification Search
CPC .............................. B25J 9/1605; B25J 9/0084
See application file for complete search history.

(56) References Cited

U.S. PATENT DOCUMENTS

| | | | | |
|---|---|---|---|---|
| 10,773,382 | B2 * | 9/2020 | Bai | ........................ B25J 9/1612 |
| 11,521,009 | B2 * | 12/2022 | Peake | ................... G06K 9/6256 |
| 2007/0268288 | A1 * | 11/2007 | Duriez | .................... G06T 19/00 |
| | | | | 345/419 |
| 2019/0057536 | A1 | 2/2019 | Fenney | |
| 2021/0133929 | A1 * | 5/2021 | Ackerson | ................ G06T 9/001 |

OTHER PUBLICATIONS

NVIDIA Corporation; "VRWorks—Single Pass Stereo" [Retrieved on Oct. 30, 2020 from Internet] https://developer.nvidia.com/vrworks/graphics/singlepassstereo; 2 pages.
Kilgard et al. NVIDIA Corporation "NV_stereo_view_rendering"; Revision 3; Last Modified Nov. 25, 2017; [Retrieved on Oct. 30, 2020 from Internet] https://khronos.org/registry/OpenGL/extensions/NV/NV_stereo_view_rendering.txt; 7 pages.

* cited by examiner

*Primary Examiner* — Khoi H Tran
*Assistant Examiner* — Rodney P King
(74) *Attorney, Agent, or Firm* — Gray Ice Higdon (57) ABSTRACT

Implementations are described herein for single iteration, multiple permutation robot simulation. In various implementations, one or more poses of a simulated object may be determined across one or more virtual environments. A plurality of simulated robots may be operated across the one or more virtual environments. For each simulated robot of the plurality of simulated robots, a camera transformation may be determined based on respective poses of the simulated robot and simulated object in the particular virtual environment. The camera transformation may be applied to the simulated object in the particular virtual environment of the one or more virtual environments in which the simulated robot operates. Based on the camera transformation, simulated vision data may be rendered that depicts the simulated object from a perspective of the simulated robot. Each of the plurality of simulated robots may be operated based on corresponding simulated vision data.

20 Claims, 6 Drawing Sheets

SINGLE ITERATION, MULTIPLE PERMUTATION ROBOT SIMULATION

BACKGROUND

Robots are often equipped with various types of machine learning models that are trained to perform various tasks and/or to enable the robots to engage with dynamic environments. These models are sometimes trained by causing real-world physical robots to repeatedly perform tasks, with outcomes of the repeated tasks being used as training examples to tune the models. However, extremely large numbers of repetitions may be required in order to sufficiently train a machine learning model to perform tasks in a satisfactory manner.

The time and costs associated with training models through real-world operation of physical robots may be reduced and/or avoided by simulating robot operation in simulated (or "virtual") environments. For example, a three-dimensional virtual environment may be simulated with various objects to be acted upon by a robot. The robot itself may also be simulated in the virtual environment, and the simulated robot may be operated to perform various tasks on the simulated objects. The machine learning model(s) can be trained based on outcomes of these simulated tasks. In some cases, simulation is good enough to train or "bootstrap" robot machine models in an expedited and/or inexpensive manner, e.g., so that the model(s) can then be further trained, or "polished," using a limited number of real-world robot operations.

SUMMARY

As is often the case with machine learning, the more training data used to train a machine learning model, the better trained the model will be. Consequently, it is typical to perform vast amounts of robot simulations in order to generate sufficient training data. This may require massive amounts of computing resources as more and more simulated robots are operated to act upon greater numbers of simulated objects. During each iteration of robot simulation, which may be controlled by a "world clock" in some implementations, the "logical geometry" of a virtual environment—which may include current poses of all the simulated objects/robot(s) therein and may alternatively be referred to as a "scene"—may be reprocessed and re-rendered from the perspective of each individual robot. This can require inordinate amounts of computing resources and/or time if there are thousands of simulated robots being operated at the same time.

Accordingly, implementations are described herein for single iteration, multiple permutation robot simulation. In various implementations, a plurality of simulated robots may be operated in a single virtual environment, or across multiple virtual environments. Additionally, any number of simulated objects (e.g., dozens, hundreds, thousands) that can be acted upon by the simulated robots are also provided within each virtual environment. Notably, in implementation in which there are multiple virtual environments, the same simulated objects may be present in each. Because simulated robots can act upon simulated objects to change the simulated objects' poses, the logical geometry dynamically changes during each iteration of simulated robot operation. If there are multiple virtual environments, the simulated objects' poses may diverge across virtual environments.

Rather than re-processing the logical geometry of each virtual environment for each simulated robot's perspective during each iteration, with techniques described herein, the logical geometry of one or more virtual environments may be calculated once, in a single pass. Differences (or "deltas") between simulated robot poses and/or simulated object poses (between multiple virtual environments) may be determined. These differences may be used to tailor the logical geometry to each individual simulated robot in each virtual environment.

This tailoring may include determining a camera transformation based on the simulated robot's current pose—and hence, perspective—in the environment. This tailoring may additionally or alternatively include determining one or more geometric transforms that represent differences between poses/configurations of simulated object(s) in the current virtual environment compared to, for instance, the simulated object(s) pose(s) in other virtual environment(s) and/or starting pose(s) of the simulated object(s).

Once the logical geometry and differences are calculated for each simulated robot/virtual environment, data indicative thereof, such as display list(s), may be provided to downstream component(s), such as graphics accelerator, a graphical processing unit (GPU), etc. A display list may take the form of, for instance, a series of graphics commands that define an output image. Simulation vision data may be rendered by the downstream component(s) for each simulated robot by executing the graphics commands to combine various graphics primitives (most commonly, but not exclusively, lines, points, and polygons/triangles) into a rasterized image. This rasterized image may be used as simulated vision data that depicts one or more simulated objects from the perspective of the simulated robot. The simulated robot can then act in accordance with the simulated vision data, just as though the simulated robot had captured the vision data using a real-life vision sensor.

Techniques described herein may conserve considerable computing resources. Processing the logical geometry of one or more virtual environments once for multiple simulated robots requires less processing cycles than processing the logical geometry once per simulated robot. In particular, determining the differences between different simulated robots' perspectives of a scene (e.g., camera transforms) and differences between poses of simulated objects (e.g., geometric transforms) may use less computing resources than re-calculating the logical geometry of the scene for each simulated robot.

In some implementations, a method may be implemented using one or more processors and may include: determining one or more poses of a simulated object across one or more virtual environments, wherein a plurality of simulated robots are operated across the one or more virtual environments; for each simulated robot of the plurality of simulated robots, determining a camera transformation to be applied to the simulated object in the particular virtual environment of the one or more virtual environments in which the simulated robot operates, wherein the determining is based on respective poses of the simulated robot and simulated object in the particular virtual environment, and based on the camera transformation, rendering simulated vision data that depicts the simulated object from a perspective of the simulated robot; and operating each of the plurality of simulated robots based on corresponding simulated vision data.

In various implementations, the one or more poses of the simulated object may be determined by a central processing unit (CPU) and the rendering is performed by a graphics processing unit (GPU). In various implementations, the pose of the simulated object may be represented as a display list.

In various implementations, the one or more virtual environments may include a plurality of virtual environments and at least one of the plurality of simulated robots may operate in each of the plurality of virtual environments. In various implementations, the simulated object may be present simultaneously in each of the plurality of virtual environments. In various implementations, determining the one or more poses of the simulated object may include determining a distinct pose of the simulated object in each of the plurality of virtual environments. In various implementations, the distinct pose of the simulated object in a given one of the virtual environments may be determined based on one or more actions performed on the simulated object by the simulated robot that operates in the given one of the virtual environments.

In various implementations, the method may further include, for each virtual environment of the plurality of virtual environment, determining a geometric transformation of the simulated object based on the distinct pose of the simulated object in the virtual environment. In various implementations, the rendering may be further based on the geometric transformation.

In another aspect, method may be implemented using one or more processors and may include: determining a distinct pose of a simulated object in each of a plurality of virtual environments, wherein a plurality of simulated robots are operated across the plurality of virtual environments; for each simulated robot of the plurality of simulated robots, determining a geometric transformation of the simulated object based on the distinct pose of the simulated object in the virtual environment of the plurality of virtual environments in which the simulated robot operates; and based on the geometric transformation, rendering simulated vision data that depicts the simulated object in its distinct pose; and operating each of the plurality of simulated robots based on corresponding simulated vision data.

Other implementations may include a non-transitory computer readable storage medium storing instructions executable by a processor to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
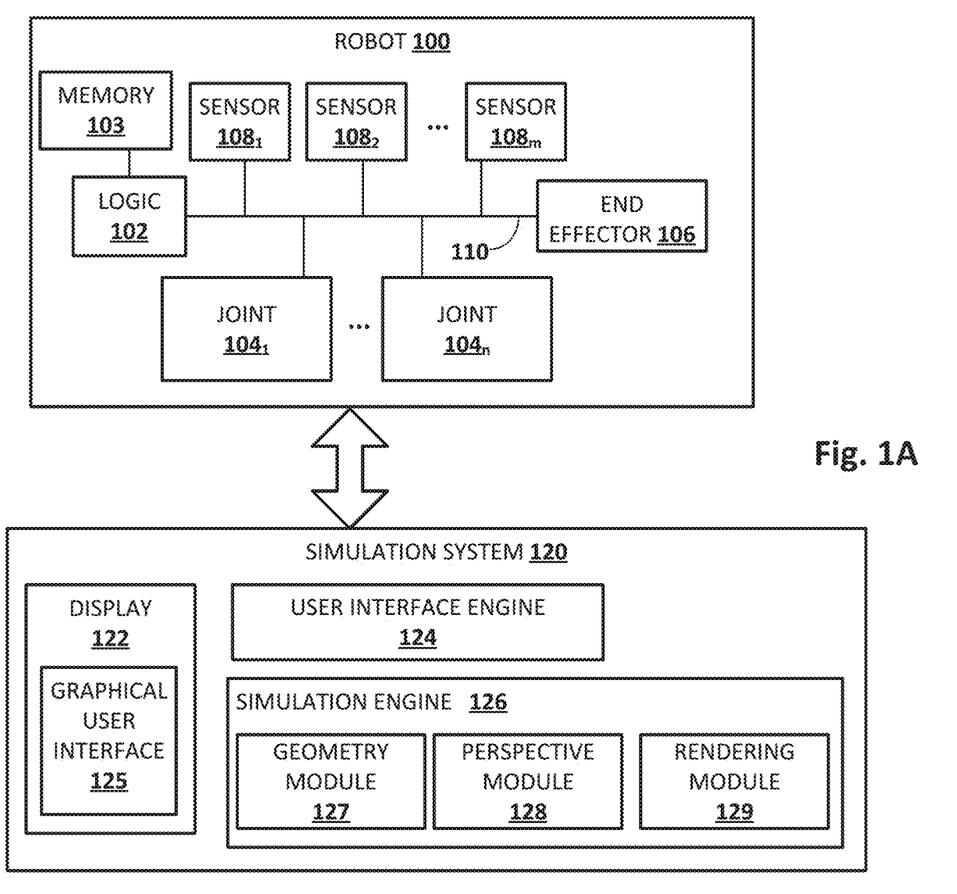
FIG. 1A schematically depicts an example environment in which disclosed techniques may be employed, in accordance with various implementations.

FIG. 1A is a schematic diagram of an example environment in which selected aspects of the present disclosure may be practiced in accordance with various implementations. The various components depicted in FIG. 1A, particularly those components forming a simulation system 120, may be implemented using any combination of hardware and software. In some implementations, simulation system 120 may include one or more servers forming part of what is often referred to as a "cloud" infrastructure, or simply "the cloud."

Figure 1B:
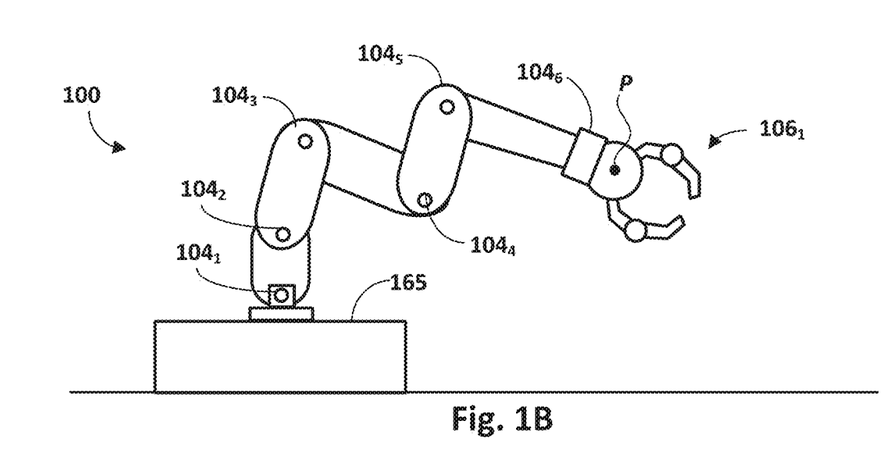
FIG. 1B depicts an example robot, in accordance with various implementations.

A robot 100 may be in communication with simulation system 120. Robot 100 may take various forms, including but not limited to a telepresence robot (e.g., which may be as simple as a wheeled vehicle equipped with a display and a camera), a robot arm, a humanoid, an animal, an insect, an aquatic creature, a wheeled device, a submersible vehicle, an unmanned aerial vehicle ("UAV"), and so forth. One non-limiting example of a robot arm is depicted in FIG. 1B. In various implementations, robot 100 may include logic 102. Logic 102 may take various forms, such as a real time controller, one or more processors, one or more field-programmable gate arrays ("FPGA"), one or more application-specific integrated circuits ("ASIC"), and so forth. In some implementations, logic 102 may be operably coupled with memory 103. Memory 103 may take various forms, such as random access memory ("RAM"), dynamic RAM ("DRAM"), read-only memory ("ROM"), Magnetoresistive RAM ("MRAM"), resistive RAM ("RRAM"), NAND flash memory, and so forth.

In some implementations, logic 102 may be operably coupled with one or more joints $104_{1-n}$, one or more end effectors 106, and/or one or more sensors $108_{1-m}$, e.g., via one or more buses 110. As used herein, "joint" 104 of a robot may broadly refer to actuators, motors (e.g., servo motors), shafts, gear trains, pumps (e.g., air or liquid), pistons, drives, propellers, flaps, rotors, or other components that may create and/or undergo propulsion, rotation, and/or motion. Some joints 104 may be independently controllable, although this is not required. In some instances, the more joints robot 100 has, the more degrees of freedom of movement it may have.

As used herein, "end effector" 106 may refer to a variety of tools that may be operated by robot 100 in order to accomplish various tasks. For example, some robots may be equipped with an end effector 106 that takes the form of a claw with two opposing "fingers" or "digits." Such as claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, containers, trays, and so forth. In some implementations, end effector 106 may be removable, and various types of modular end effectors may be installed onto robot 100, depending on the circumstances.

Sensors 108 may take various forms, including but not limited to 3D laser scanners or other 3D vision sensors (e.g., stereographic cameras used to perform stereo visual odometry) configured to provide depth measurements, two-dimensional cameras (e.g., RGB, infrared), light sensors (e.g., passive infrared), force sensors, pressure sensors, pressure wave sensors (e.g., microphones), proximity sensors (also referred to as "distance sensors"), depth sensors, torque sensors, barcode readers, radio frequency identification ("RFID") readers, radars, range finders, accelerometers, gyroscopes, compasses, position coordinate sensors (e.g., global positioning system, or "GPS"), speedometers, edge detectors, and so forth. While sensors $108_{1-m}$ are depicted as being integral with robot 100, this is not meant to be limiting.

Simulation system 120 may include one or more computing systems connected by one or more networks (not depicted). An example of such a computing system is depicted schematically in FIG. 6. In various implementations, simulation system 120 may be operated to simulate virtual environment(s) in which multiple simulated robots (not depicted in FIG. 1, see FIGS. 3, 4A, 4B) are simulated. In some implementations, one or more simulated robots may be controlled by one or more real-life (e.g., hardware) robot controllers, which may include, for instance, logic 102 and memory 103 of real-life robot 100. In other implementations, the entirety of a robot, including its controller, may be simulated by simulation system 120, and robot 100 may be omitted.

Various modules or engines may be implemented as part of simulation system 120 as software, hardware, or any combination of the two. For example, in FIG. 1A, simulation system 120 includes a display interface 122 that is controlled, e.g., by a user interface engine 124, to render a graphical user interface ("GUI") 125. A user may interact with GUI 125 to trigger and/or control aspects of simulation system 120, e.g., to control a simulation engine 126 that simulates the aforementioned virtual environment.

Simulation engine 126 may be configured to perform selected aspects of the present disclosure to simulate a virtual environment in which the aforementioned simulated robots can be operated. For example, simulation engine 126 may be configured to simulate one or more three-dimensional environments, each that includes simulated object(s) that can be acted upon by simulated robot(s). In some implementations, the virtual environment(s) may include a plurality of simulated robots that are controlled independently and contemporaneously by a corresponding plurality of robot controllers (e.g., 102 and 103 of robot 100 in combination) that are external from the virtual environment. In other implementations, simulated robots may be implemented entirely in software, e.g., by simulation engine 126. Note that the virtual environment need not be rendered visually on a display. In many cases, the virtual environment and the operations of simulated robots within it may be simulated without any visual representation being provided on a display as output.

Simulation engine 126 may include a geometry module 127, a perspective module 128, and a rendering module 129. In some implementations, geometry module 127 and perspective module 128 may be implemented by a central processing unit (CPU) of simulation system 120, and rendering module 129 may be implemented by a graphics processing unit (GPU) of simulation system 120. However, this is not required and other configurations are possible.

Geometry module 127 may be configured to determine pose(s) of simulated object(s) across one or more virtual environments, e.g., at each iteration of robot simulation that is controlled, for instance, by the aforementioned world clock. These poses may collectively form what is referred to herein as the "logical geometry" or "scene" of a virtual environment during a given iteration of robot simulation. When simulated robots act upon (e.g., move, rearrange) simulated objects during one iteration, the poses of those simulated objects may be recalculated for the next iteration. In addition, in virtual environments in which multiple simulated robots are present, the poses of the multiple simulated robots—in relation to each other and/or to simulated object(s)—may change, too.

In implementations in which multiple virtual environments are simulated at once, with at least some simulated objects being common across the multiple virtual environments, geometry module 127 may also be tasked with determining geometric transforms of the common simulated objects across the multiple virtual environments. Geometric transforms may affect the position, orientation, and/or configuration of an object across multiple different virtual environments. Suppose the same simulated object is left in its original pose in a first virtual environment and is moved into a second pose in a second virtual environment. Geometry module 127 may calculate the geometric transformation between the first and second poses (e.g., translate object x pixels along <vector>, rotate y degrees CW). This geometric transformation may be used to tailor data indicative of a virtual environment's logical geometry so that when rendered, e.g., by rendering module 129, simulated objects appear as expected in each virtual environment.

Perspective module 128 may be configured to determine camera transformation(s) to be applied, e.g., by rendering module 129, to simulated object(s) in a virtual environment in which a target simulated robot operates. This determining may be based on respective poses of the target simulated robot and one or more simulate object(s) in the target simulated robot's virtual environment. Intuitively, a simulated robot's position relative to a simulated object will dictate how the object appears to the robot. If the simulated robot is far away from the simulated object, the simulated object would appear smaller than if the simulated robot were close. Additionally, the simulated robot will be able to perceive only those aspects of the simulated object that are within a field of view of a (simulated) vision sensor of the simulated robot; the simulated robot may not perceive surface(s) of the simulated object that face away from the simulated robot's vision sensor, for instance. Unlike a geometric transform, a camera transformation only affects how simulated object(s) are perceived by simulated robot(s); the simulated objects themselves are unaffected.

Based on the logical geometry and/or geometric transform(s) provided by geometry module 127, and based on the camera transforms provided by perspective module 128, rendering module 129 may simulate (e.g., rasterize) vision sensor data from perspective(s) of the simulated robot(s). As an example, suppose a particular simulated robot's vision sensor is pointed in a direction of a particular simulated object in the virtual environment. Rendering module 129 may generate and/or provide, to a robot controller or other logic that controls that particular simulated robot, simulated vision sensor data that depicts the particular virtual object as it would appear from the perspective of the particular simulated robot (and more particularly, its vision sensor) in the virtual environment.

In implementations in which one or more simulated robots is controlled by an external robot controller, simulation engine 126 may also be configured to receive, from each robot controller, joint commands that cause actuation of one or more joints of the respective simulated robot that is controlled by the robot controller. For example, the external robot controller may process the sensor data received from simulation engine 126 to make various determinations, such as recognizing a simulated object and/or its pose (perception), planning a path to the simulated object and/or a grasp to be used to interact with the simulated object, etc. The external robot controller may make these determinations and may generate (execution) joint commands for one or more joints of a robot associated with the robot controller.

In the context of the virtual environment simulated by simulation engine 126, these joint commands may be used, e.g., by rendering module 129, to actuate joint(s) of the simulated robot that is controlled by the external robot controller. Given that there may be multiple simulated robots in the virtual environment at any given moment, in some cases, actuating joints of two or more of the simulated robots may cause the two or more simulated robots to act upon an interactive object in the virtual environment, e.g., one after the other (e.g., one simulated robot moves an object so another simulated robot can clean under it), simultaneously (e.g., one simulated robot lifts a vehicle so another simulated robot can change the vehicle's tire), etc.

FIG. 1B depicts a non-limiting example of a robot 100 in the form of a robot arm, which may be real or, more relevant to the present disclosure, simulated. An end effector $106_1$ in the form of a gripper claw is removably attached to a sixth joint $104_6$ of robot 100. In this example, six joints $104_{1-6}$ are indicated. However, this is not meant to be limiting, and robots may have any number of joints. Robot 100 also includes a base 165, and is depicted in a particular selected configuration or "pose."

Figure 2:
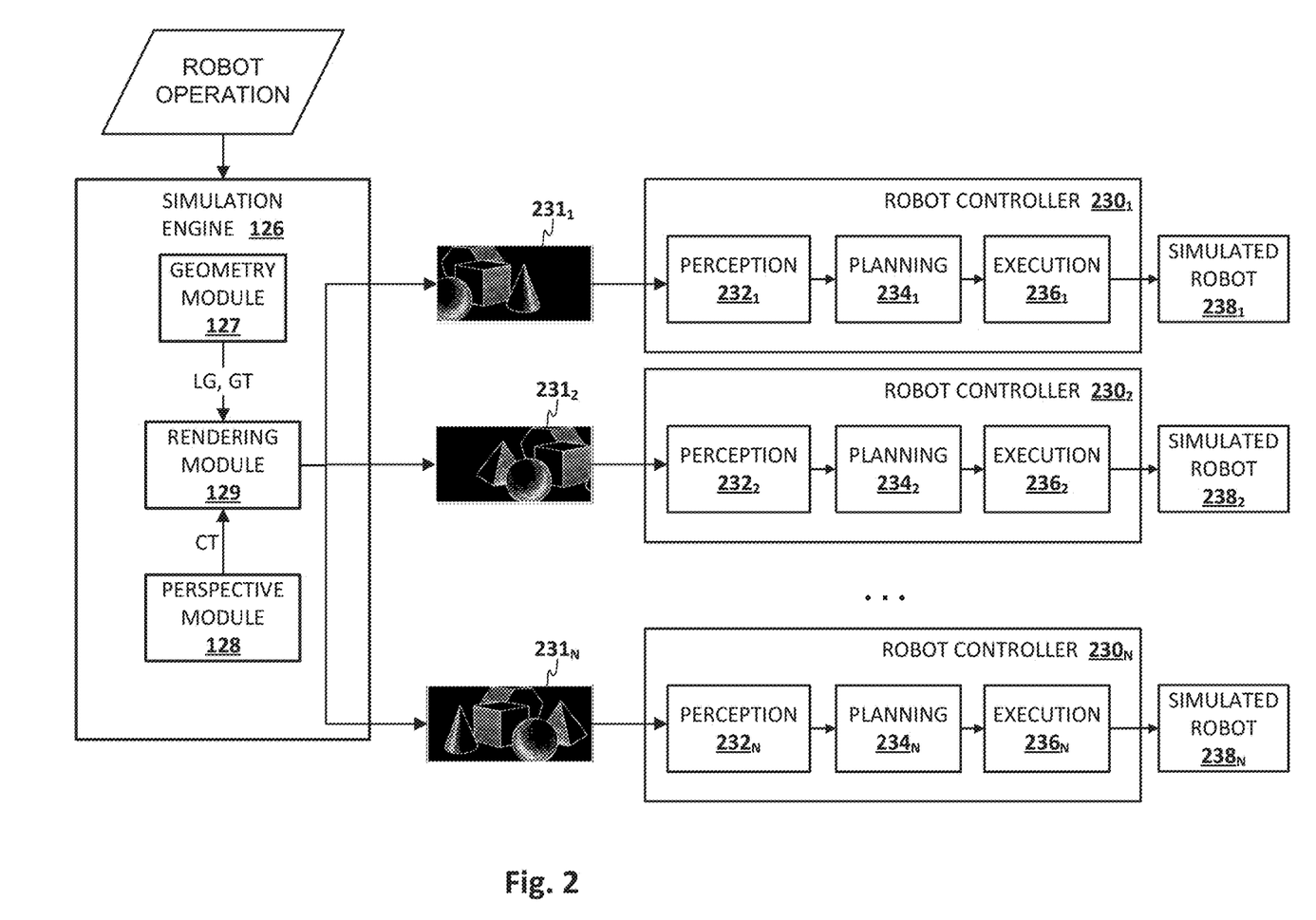
FIG. 2 schematically depicts an example of how single iteration, multiple permutation robot simulation may be implemented.

FIG. 2 schematically depicts one example of how geometry module 127, perspective module 128, and rendering module 129 of simulation engine 126 may cooperate to simulate vision data $231_1$, $231_2$, ..., $231_N$ for multiple robot controllers $230_{1-N}$ to control operation of a corresponding plurality of simulated robots $238_{1-N}$ across one or more virtual environments (not depicted). Each robot controller 230 may be either real-life external robot hardware coupled with a computing device that implements one or more virtual environments, or may be simulated, e.g., by simulation engine 126, wholly or partially in software. For example, it may not be practical to operate thousands of hardware robot controllers to control corresponding thousands of simulated robots in one or more virtual environments, in which case most, if not all, simulated robots may be simulated by simulation engine 126 as software processes.

Each robot controller 230 may include a perception module 232, a planning module 234, and an execution module 236. Each perception module $232_1$, $232_2$, ..., $232_N$ may receive simulated vision data (and other simulated vision data, if available) and assemble/synchronize that vision data with any number of other inputs, which may include, for instance other simulated sensor data, communications from other robots (e.g., regarding mapping), etc. Each perception module $232_1$, $232_2$, ..., $232_N$ may also apply the simulated vision data (which, from the perspective of a robot controller 230, may be indistinguishable from real-life digital images) across various machine learning models, such as convolutional neural networks, to perform tasks such as object recognition, pose detection, grasp planning, etc.

Based on output of respective perception modules $232_1$, $232_2$, ..., $232_N$, which may include one or more identified objects or objects classes, object poses, etc., each planning module $234_1$, $234_2$, ..., $234_N$ may perform motion planning to accomplish a task. For example, each planning module $234_1$, $234_2$, ..., $234_N$ may perform techniques such as path planning and/or collision avoidance to define a series of waypoints along a path for one or more reference points of a robot to meet. In many instances, each planning module $234_1$, $234_2$, ..., $234_N$ may perform "offline" planning at each iteration (or every x iterations) of robot simulation to generate a high-level series of waypoints, and then may perform "online" planning in real time based on dynamic objects detected by a corresponding perception module 232 (e.g., to avoid previously unseen objects that appear in the simulated robot's path).

Each execution module $236_1$, $236_2$, ..., $236_N$ may generate joint commands, e.g., taking into account simulated vision data $231_1$, $231_2$, ..., $231_N$ received during each iteration, that will cause simulated robot joints to be actuated to meet these waypoints (as closely as possible). For example, each execution module $236_1$, $236_2$, ..., $236_N$ may include a real-time trajectory planning module (not depicted) that takes into account the most recent sensor data to generate joint commands. These joint commands may be propagated to various simulated robot joints (e.g., $104_{1-6}$ in FIG. 1B) to cause various types of joint actuation.

During a given iteration of robot simulation, the components depicted in FIG. 2 may operate as follows in some implementations. Starting at top left, during the given iteration of robot simulation, data indicative of robot operation up to this point (e.g., during the previous iteration of robot simulation, or during x previous iterations) may be analyzed by simulation engine 126. This robot operation data may indicate, among other things, interaction between simulated robots and simulated objects that influences the simulated objects' poses. Geometry module 127 may determine a logical geometry ("LG" in FIG. 2) of one or more virtual environments. As mentioned previously, the logical geometry of a virtual environment may include the collective poses of simulated objects in the virtual environment. Within a single virtual environment during a single iteration of robot simulation, the logical geometry may be constant across any number of simulated robots that operate in the virtual environment.

However, if multiple virtual environments are implemented with the same simulated objects in each virtual environment, the poses of simulated objects may diverge over time in response to being acted upon by simulated robot(s). Accordingly, in some such implementations, geometry module 127 may provide, e.g., to rendering module 129, one or more geometric transformations ("GT" in FIG. 2) of one or more simulated objects. As mentioned previously, each geometric transformation may describe a difference or delta (e.g., translation, rotation, etc.) between a corresponding simulated object and some reference object/pose, such as the simulated object's origin pose, the simulated object's pose in some reference virtual environment (e.g., the first virtual environment for which logical geometry is calculated during an iteration of robot simulation), etc. In some implementation, geometric transformations may be provided by geometry module 127 regardless of whether there are multiple virtual environments implemented. In such a case, the geometric transformations provided to robot controllers 230 of simulated robots 238 in the same virtual environment may be identical.

Perspective module 128 may generate, for each robot controller 230 (and hence, each simulated robot 238), a camera transformation ("CT" in FIG. 2) to be applied, e.g., for each simulated object or across a plurality of simulated objects. Each camera transformation generated for each robot controller 230 may be generated based on a current pose of the respective simulated robot 238 in the virtual environment, relative to one or more simulated objects. Perspective module 128 may provide the camera transformations to rendering module 129.

Based on the transformations received from geometry module 127 and perspective module 128, as well as the logical geometry received from geometry module 127, rendering module 129 may render (e.g., rasterize) simulated vision data $231_{1-N}$ for provision to perception modules $232_{1-N}$ of robot controller $2340_N$. As shown in FIG. 2, simulated vision data 231 may vary between robot controllers based on, for instance, the pose of each simulated robot 238 in its virtual environment.

Thus, first simulated vision data $231_1$ depicts simulated objects having various shapes (e.g., a cone, a cube, a sphere, etc.) from one perspective. Second simulated vision data $231_2$ depicts the same simulated objects from another perspective. Nth simulated vision data $231_N$ depicts the same simulated objects from yet another perspective that is on an opposite side of the simulated objects as first and second simulated robots $238_{1-2}$. Consequently, Nth simulated vision data $231_N$ is reversed from (a mirror image of) first and second simulated vision data $231_{1-2}$. Poses of the simulated objects depicted in simulated vision data $231_{1-N}$ in FIG. 2 are constant because, for instance, all simulated robots $238_{1-N}$ are in the same virtual environment. However, if simulated robots $238_{1-N}$ were spread across multiple virtual environments with simulated objects in divergent poses, then poses of the simulated objects may likewise differ across instances of simulated vision data 231.

Figure 3:
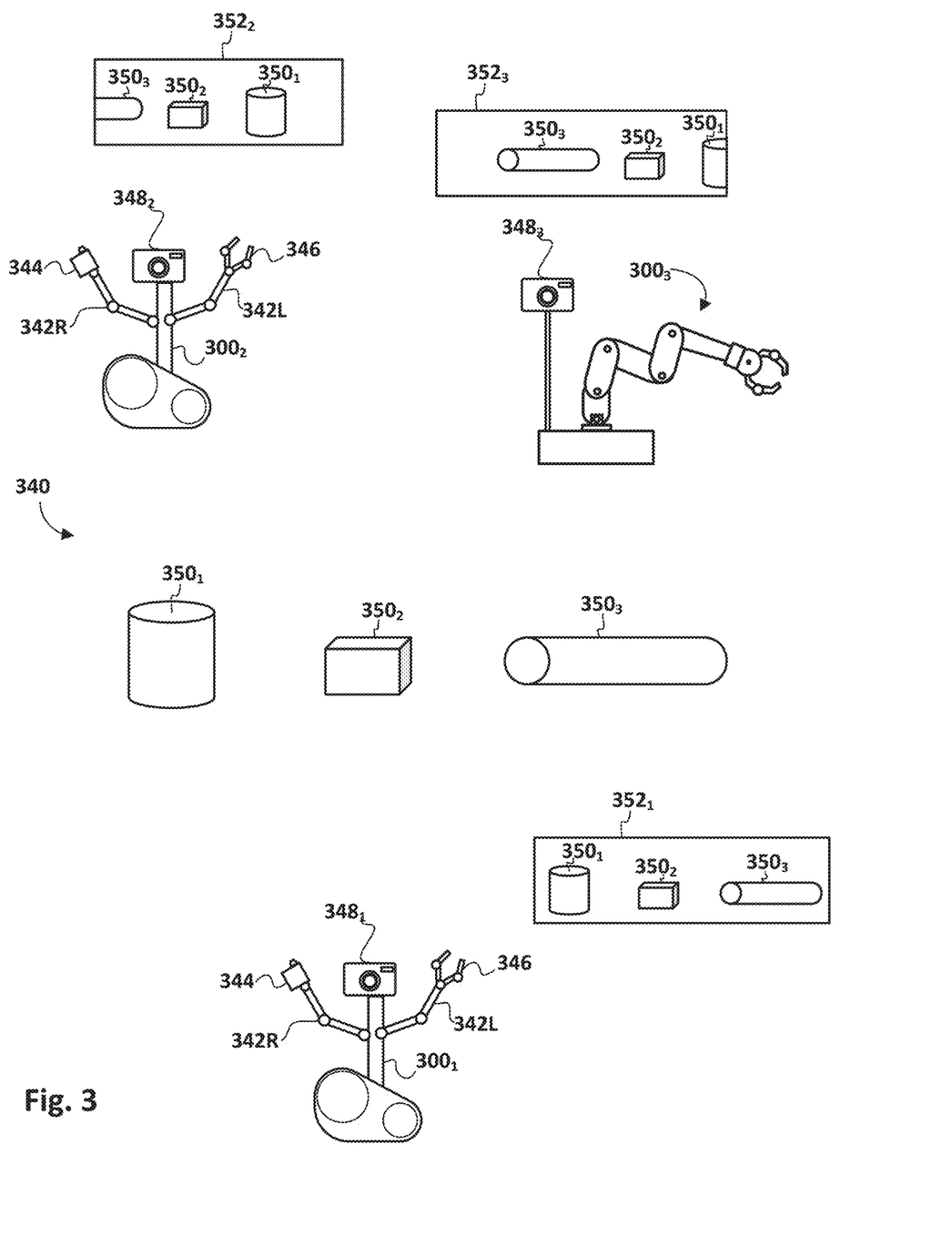
FIG. 3 depicts an example of how techniques described herein may be employed to simulate operation of multiple robots in a single virtual environment, in accordance with various implementations.

FIG. 3 depicts an example virtual environment 340 in which three simulated robots $300_{1-3}$ operate in the presence of three simulated objects $350_{1-3}$. In this example, first and second simulated robots $300_{1-2}$ each take the form of a robot with two operable arms 342L and 342R. Operable arm 342L includes an end effector in the form of a sprayer 344, and operable arm 342R includes an end effector in the form of a gripper 346. Each of first and second simulated robots $300_{1-2}$ includes a vision sensor $348_{1-2}$. Third simulated robot 3003 takes the form of a robot arm similar to robot 100 in FIGS. 1A-B and also operates in cooperation with a vision sensor $348_3$.

Simulation engine 126 may generate simulated vision data $352_{1-3}$ for simulated robots $300_{1-3}$ in virtual environment 340, e.g., based on a pose (and hence, a perspective) of each simulated robot 300 within virtual environment 340. Thus, for instance, first simulated robot $300_1$, and more particularly, its vision sensor $348_1$, would "see" simulated objects $350_{1-3}$ as shown in first simulated vision data $352_1$, with first simulated object $350_1$ on the left, second simulated object $350_2$ in the middle, and third simulated object $350_3$ on the right. First simulated robot $300_1$ is aligned more or less in the middle of simulated objects $350_{1-3}$. Accordingly, first simulated vision data $352_1$ captures all three simulated objects $350_{1-3}$ in its field of view as shown in FIG. 3.

Second simulated robot 3002 is positioned in virtual environment 340 on an opposite side of simulated objects $350_{1-3}$ from first robot $300_1$. Consequently, the three simulated objects $350_{1-3}$ are reversed in second simulated vision data 3522 from first simulated vision data $352_1$, with third simulated object $350_3$ on the left of second simulated object $350_2$ and first simulated object $350_1$ on the right. Additionally, second simulated robot 3002 perceives the opposite sides of simulated objects $350_{1-3}$ as first simulated robot $300_1$. Second simulated robot 3002 is also positioned at a horizontal offset relative to second simulated object $350_2$. Consequently, second simulated vision data 3522 depicts the entirety of the closest simulated object $350_1$ to second simulated robot 3002 but only depicts a portion of third simulated object $350_3$ that is captured in a field of view of its vision sensor 3482.

Third simulated robot 3003 is also positioned in virtual environment 340 on an opposite side of simulated objects $350_{1-3}$ from first robot $300_1$. Consequently, and as was the case with second simulated vision data 3522, the three simulated objects $350_{1-3}$ are reversed in third simulated vision data 3523 from first simulated vision data $352_1$, with third simulated object $350_3$ on the left of second simulated object $350_2$ and first simulated object $350_1$ on the right. Additionally, third simulated robot 3003 perceives the opposite sides of simulated objects $350_{1-3}$ as first simulated robot $300_1$. Third simulated robot 3003 is also positioned at a horizontal offset relative to second simulated object $350_2$. Consequently, third simulated vision data 3523 depicts the entirety of the closest (third) simulated object $350_3$ but only depicts a portion of first simulated object $350_1$ that is captured in a field of view of its vision sensor $348_3$.

Figure 4A:
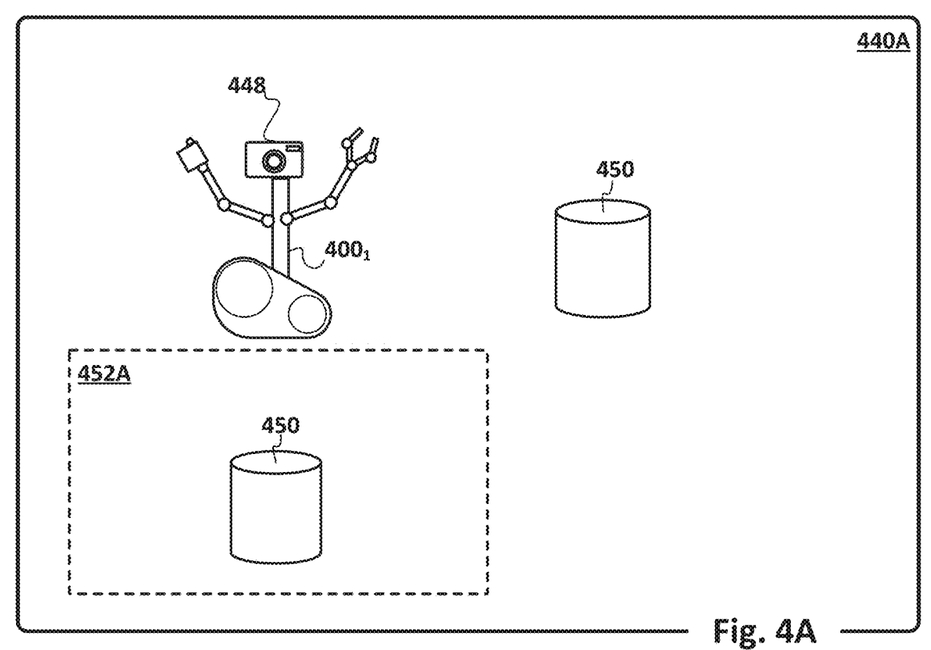
FIGS. 4A and 4B depict an example of how techniques described herein may be employed to simulate robot operation across multiple virtual environments, in accordance with various implementations.
Figure 4B:
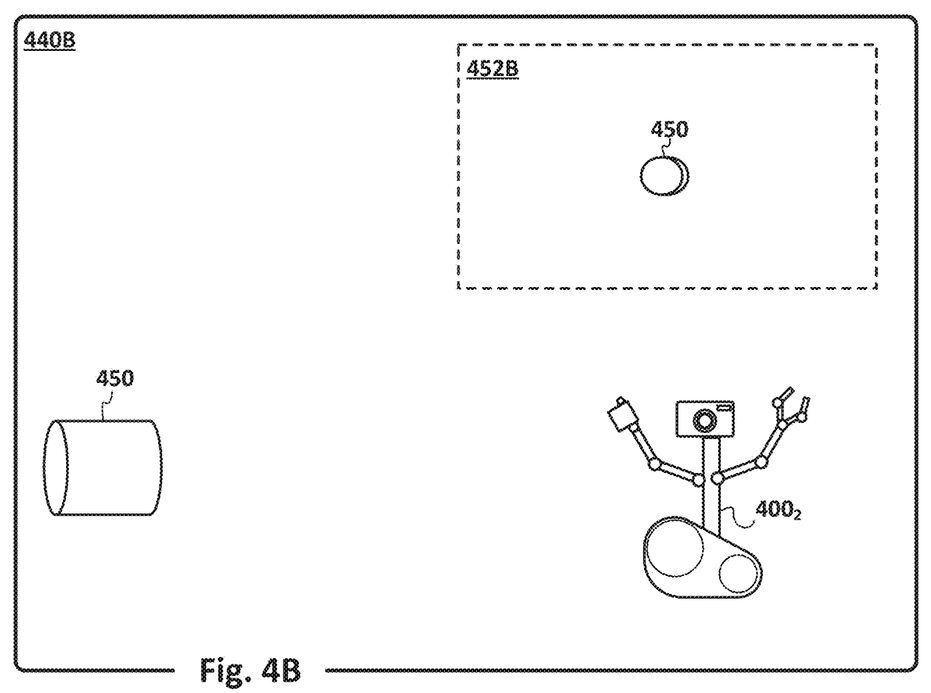

FIGS. 4A and 4B depict an example of how different simulated vision data 452A, 452B may be generated to depict the same simulated object 450 in divergent poses, and from different simulated robot perspectives, across two different virtual environments 440A, 440B. FIG. 4A depicts a first simulated robot 4001 operating in first virtual environment 440A. First simulated robot 4001 perceives simulated object 450 from a relatively close distance. Additionally, the pose of simulated object 450 in first virtual environment 440A is upright. Consequently, first simulated vision data 452A may appear as depicted in FIG. 4A.

FIG. 4B depicts a second simulated robot 4002 operating in second virtual environment 440B. Second simulated robot 4002 perceives simulated object 450 from farther away than did first simulated robot 4001. Additionally, the pose of simulated object 450 in second virtual environment 440B is tipped over. Consequently, second simulated vision data 452B may appear as depicted in FIG. 4B, in which it is smaller than in first simulated vision data 452A.

Figure 5:
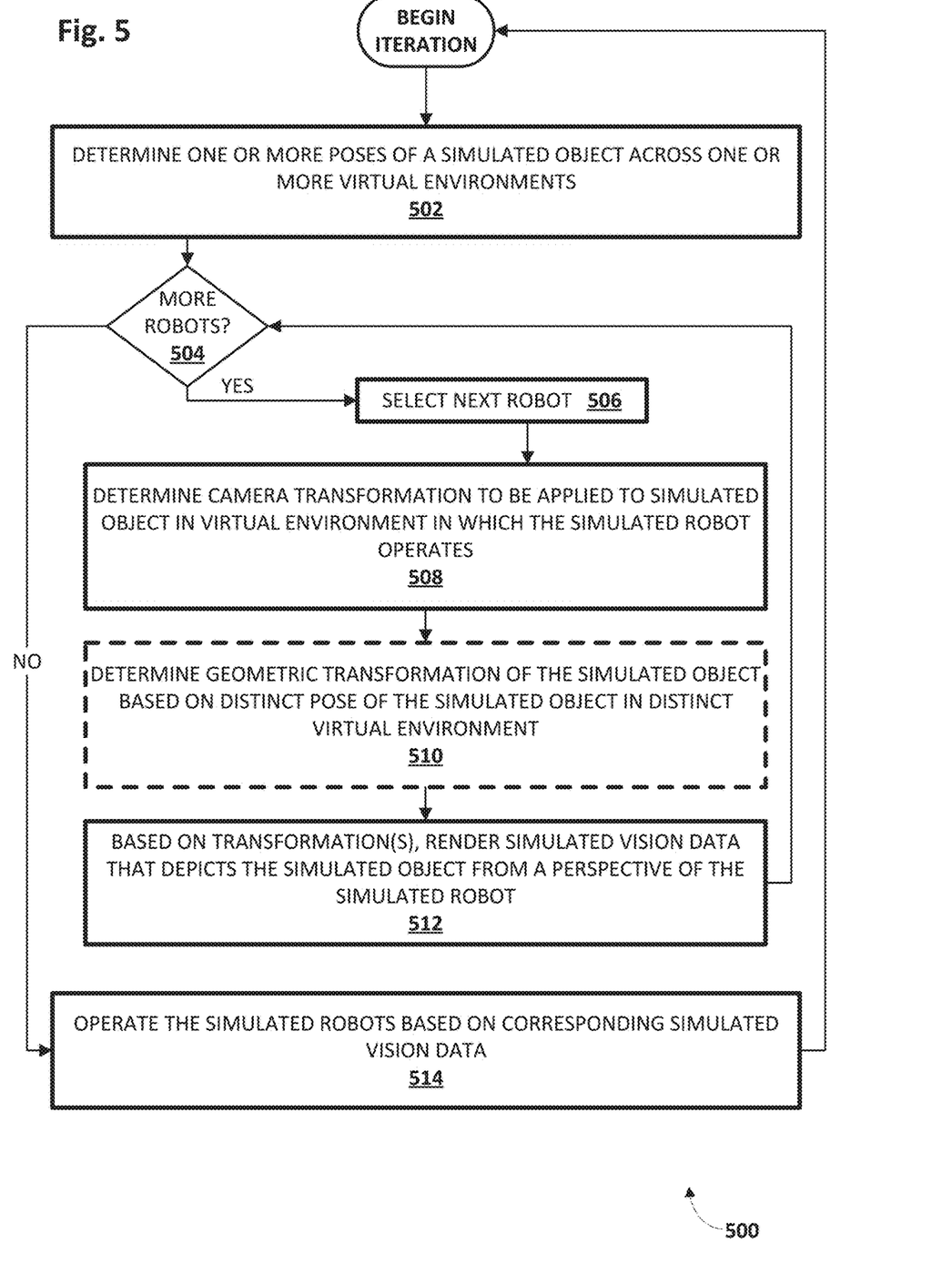
FIG. 5 depicts an example method for practicing selected aspects of the present disclosure.

Referring now to FIG. 5, an example method 500 of practicing selected aspects of the present disclosure is described. For convenience, the operations of the flowchart are described with reference to a system that performs the operations. This system may include various components of various computer systems. For instance, various operations may be performed by one or more components of simulation system 120. Moreover, while operations of method 500 are shown in a particular order, this is not meant to be limiting. One or more operations may be reordered, omitted or added.

At the outset of method 500 (i.e., at the beginning of an iteration of robot simulation), a plurality of simulated robots may be operated across one or more virtual environments. At block 502, the system, e.g., by way of geometry module 127 of simulation engine 126, may determine one or more poses of a simulated object across the one or more virtual environments. These poses may be determined (e.g., updated) based on, for instance, robot manipulation of the object.

At block 504, the system may determine whether there are more simulated robots for which simulated vision data needs to be generated. If the answer at block 504 is yes, then method 500 may enter a loop (blocks 506-512) that begins at block 506, where the system selects a simulated robot as the "current" simulated robot.

At block 508, the system, e.g., by way of perspective module 128, may determine a camera transformation to be applied to the simulated object in the particular virtual environment of the one or more virtual environments in which the current simulated robot operates. In various implementations, the determining may be based on respective poses of the current simulated robot and simulated object in the particular virtual environment. If there are multiple virtual environments implemented, then at block 510 (which is dashed to indicated it may be omitted where only a single virtual environment is implemented), the system, e.g., by way of geometry module 127, may determine a geometric transformation of the simulated object based on a distinct pose of the simulated object in a distinct virtual environment of the plurality of virtual environments. In other implementations, block 508 may be omitted and block 510 may remain.

Based on the camera transformation determined at block 508, and the geometric transformation determined at block 510 if applicable, at block 512, the system, e.g., by way of rendering module 129, may render simulated vision data that depicts the simulated object from a perspective of the current simulated robot. For instance, display lists that embody the logical geometry, as modified by the transformations determined at blocks 502 and 508-510, may be passed to a GPU, which may rasterize the display list into simulated vision data. Then, method may pass back to block 504 to determine whether there are any additional simulated robots for which simulated vision data needs to be generated. If the answer at block 504 is no, then method proceeds to block 514, at which point the system may operate each of the plurality of simulated robots based on corresponding simulated vision data. Method 500 may then proceed to the next iteration of robot simulation.

Figure 6:
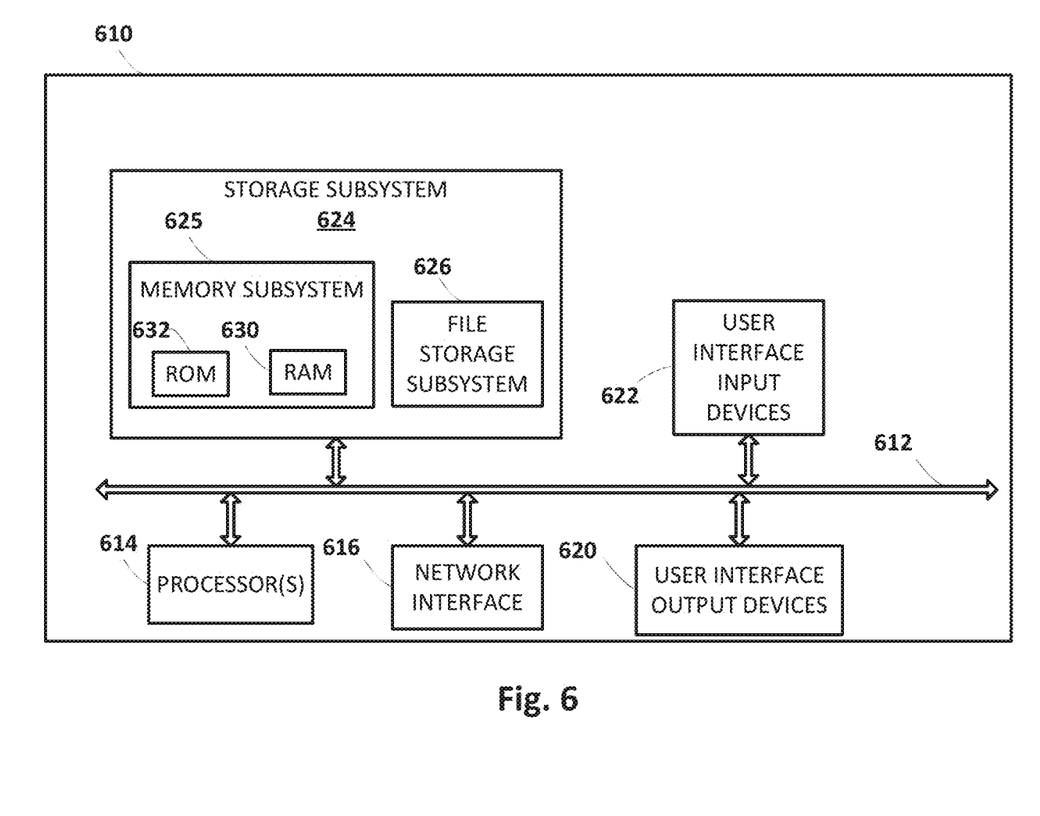
FIG. 6 schematically depicts an example architecture of a computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 500, and/or to implement one or more aspects of robot 100 or simulation system 120. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a CD-ROM drive, an optical drive, or removable media cartridges. Modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
   determining one or more poses of a simulated object across one or more virtual environments, wherein a plurality of simulated robots are operated across the one or more virtual environments;
   for each simulated robot of the plurality of simulated robots,
      determining a camera transformation to be applied to the simulated object in the particular virtual environment of the one or more virtual environments in which the simulated robot operates, wherein the determining is based on respective poses of the simulated robot and simulated object in the particular virtual environment, and
      based on the camera transformation, rendering simulated vision data that depicts the simulated object as the simulated object would appear from a perspective of the simulated robot; and
   operating each of the plurality of simulated robots based on corresponding simulated vision data.

2. The method of claim 1, wherein the one or more poses of the simulated object are determined by a central processing unit (CPU) and the rendering is performed by a graphics processing unit (GPU).

3. The method of claim 2, wherein the one or more poses of the simulated object are represented as a display list.

4. The method of claim 1, wherein:
   the one or more virtual environments comprise a plurality of virtual environments;
   at least one of the plurality of simulated robots operates in each of the plurality of virtual environments; and
   the simulated object is present simultaneously in each of the plurality of virtual environments.

5. The method of claim 4, wherein determining the one or more poses of the simulated object comprises determining a distinct pose of the simulated object in each of the plurality of virtual environments.

6. The method of claim 5, wherein the distinct pose of the simulated object in a given one of the virtual environments is determined based on one or more actions performed on the simulated object by the simulated robot that operates in the given one of the virtual environments.

7. The method of claim 5, further comprising, for each virtual environment of the plurality of virtual environments, determining a geometric transformation of the simulated object based on the distinct pose of the simulated object in the virtual environment.

8. The method of claim 7, wherein the rendering is further based on the geometric transformation.

9. A system comprising one or more processors and memory storing instructions that, in response to execution of the instructions by the one or more processors, cause the one or more processors to:
   determine one or more poses of a simulated object across one or more virtual environments, wherein a plurality of simulated robots are operated across the one or more virtual environments;
   for each simulated robot of the plurality of simulated robots,
      determine a camera transformation to be applied to the simulated object in the particular virtual environment of the one or more virtual environments in which the simulated robot operates, wherein the camera transformation is determined based on respective poses of the simulated robot and simulated object in the particular virtual environment, and
      based on the camera transformation, render simulated vision data that depicts the simulated object as the simulated object would appear from a perspective of the simulated robot; and
   operate each of the plurality of simulated robots based on corresponding simulated vision data.

10. The system of claim 9, wherein the one or more poses of the simulated object are determined by a central processing unit (CPU) and the simulated vision data is rendered by a graphics processing unit (GPU).

11. The system of claim 10, wherein the one or more poses of the simulated object are represented as a display list.

12. The system of claim 9, wherein:
   the one or more virtual environments comprise a plurality of virtual environments;
   at least one of the plurality of simulated robots operates in each of the plurality of virtual environments; and
   the simulated object is present simultaneously in each of the plurality of virtual environments.

13. The system of claim 12, comprising instructions to determine a distinct pose of the simulated object in each of the plurality of virtual environments.

14. The system of claim 13, further comprising instructions to, for each virtual environment of the plurality of virtual environments, determine a geometric transformation of the simulated object based on the distinct pose of the simulated object in the virtual environment.

15. The system of claim 14, wherein the simulated vision data is rendered further based on the geometric transformation.

16. The system of claim 13, wherein the distinct pose of the simulated object in a given one of the virtual environments is determined based on one or more actions performed on the simulated object by the simulated robot that operates in the given one of the virtual environments.

17. A method implemented using one or more processors, comprising:
   determining a distinct pose of a simulated object in each of a plurality of virtual environments, wherein a plurality of simulated robots are operated across the plurality of virtual environments;
   for each simulated robot of the plurality of simulated robots,
      determining a geometric transformation of the simulated object based on the distinct pose of the simulated object in the virtual environment of the plurality of virtual environments in which the simulated robot operates; and
      based on the geometric transformation, rendering simulated vision data that depicts the simulated object in its distinct pose as the simulated object would appear from a perspective of the simulated robot; and
   operating each of the plurality of simulated robots based on corresponding simulated vision data.

18. The method of claim 17, wherein the distinct poses of the simulated object are represented in distinct display lists for the plurality of virtual environments.

19. The method of claim 17, wherein the distinct poses of the simulated object are determined by a central processing unit (CPU) and the rendering is performed by a graphics processing unit (GPU).

20. The method of claim 17, further comprising determining a camera transformation to be applied to the simulated object in a given virtual environment of one of the plurality of virtual environments in which the simulated robot operates, wherein the camera transformation is determined based on respective poses of the simulated robot and simulated object in the given virtual environment.

* * * * *